United States Patent [19]
Sidman

[11] Patent Number: 6,029,242
[45] Date of Patent: Feb. 22, 2000

[54] DATA PROCESSING SYSTEM USING A SHARED REGISTER BANK AND A PLURALITY OF PROCESSORS

[75] Inventor: Steven B. Sidman, Vancouver, Wash.

[73] Assignees: Sharp Electronics Corporation, Camas, Wash.; Sharp Kabushiki Kaisha, Osaka, Japan

[21] Appl. No.: 08/954,541

[22] Filed: Oct. 20, 1997

Related U.S. Application Data

[63] Continuation-in-part of application No. 08/515,645, Aug. 16, 1995, Pat. No. 5,680,641.

[51] Int. Cl.[7] .................................................... G06F 9/302
[52] U.S. Cl. ............................................. 712/42; 712/215
[58] Field of Search ........................... 711/147; 712/215, 712/42, 41

[56] References Cited

U.S. PATENT DOCUMENTS

| | | | |
|---|---|---|---|
| 4,630,230 | 12/1986 | Sundet | 711/169 |
| 5,163,132 | 11/1992 | DuLac et al. | 395/275 |
| 5,185,876 | 2/1993 | Nguyen et al. | 395/425 |
| 5,222,223 | 6/1993 | Webb, Jr. et al. | 395/425 |
| 5,313,648 | 5/1994 | Ehlig et al. | 395/800 |
| 5,388,217 | 2/1995 | Benzschawel | 395/856 |
| 5,418,911 | 5/1995 | Zilka | 395/310 |
| 5,507,000 | 4/1996 | Stewart | 712/34 |
| 5,787,304 | 7/1998 | Hodges | 395/821 |
| 5,913,049 | 6/1999 | Shiell | 395/391 |

OTHER PUBLICATIONS

R. Bhatia, M. Furuta and J. Ponce, Proceedings of the ICASSP—1991 International Conference on Acoustics, Speech, and Signal Processing, IEEE, Toronto, Canada, May 14–17, 1991, pp. 1085–1088.

S. Furber, *VLSI RISC Architecture and Organization,* Marcel Dekker, Inc., 1989, pp. 111–117, 123–131.

D. A. Patterson and John L. Hennessy, *Computer Architecture A Quantitative Approach,* Morgan Kaufmann Publishers, Inc., 1990, pp. 450–454.

R. Zaks, *Programming the Z80,* 3d Edition, SYBEX, Inc., 1982, pp. 61–65.

M. Slater, *Microprocessor–Based Design, A Comprehensive Guide to Hardware Design,* Prentice Hall, Inc., 1989, pp. 50–52.

i750 ®, i860™, i960® *Processors and Related Products,* Intel Corp.1993, pp. 3–30 through 3–33, 3–82 and 3–86 through 3–87.

i960™ *CA Microprocessor User's Manual,* Intel Corporation, 1992, pp. iii, 2–1 through 2–4.

M. Johnson, *Superscalar Microprocessor Design,* Prentice–Hall, Inc., 1991, pp. 41–45, 50–55, 159–163.

A. van Sommeren and C. Atack, *The ARM RISC Chip, A Programmer's Guide,* Addison–Wesley Publishing Co., 1993, pp. 21–35, 107–119.

*Primary Examiner*—Eric Coleman
*Attorney, Agent, or Firm*—David C. Ripma

[57] ABSTRACT

A system and method is provided for use in register-based CPUs for simultaneously processing data in a series of CPU register banks while concurrently loading and unloading data into additional register banks. The register banks then sequentially shared between arithmetic processors connected to the CPU datapath. Each register bank, after being loaded with data, is connected to a plurality of data processors in sequence and the data in each register bank is processed. The data is not moved between register banks within the datapath, except when it is loaded and unloaded from the datapath. The invention takes advantage of the shorter time required to move control signals, as compared with moving data.

10 Claims, 8 Drawing Sheets

Fig. 4

| SEQUENCE | I/O AND PROCESSOR PORTS: | REGISTER A (100) | REGISTER B (102) |
|---|---|---|---|
| | | 50, 51, 52, 53 | 50, 51, 52, 53 |
| 1 | CONNECT TO BUSSES: | 45 66 62 64 PROCESS | 120 145 LOAD/UNLOAD |
| 2 | CONNECT TO BUSSES: | 120 145 LOAD/UNLOAD | 45 66 62 64 PROCESS |
| 3 | CONNECT TO BUSSES: | 45 66 62 64 PROCESS | 120 145 LOAD/UNLOAD |
| 4 | CONNECT TO BUSSES: | 120 145 LOAD/UNLOAD | 45 66 62 64 PROCESS |
| ... | | | |

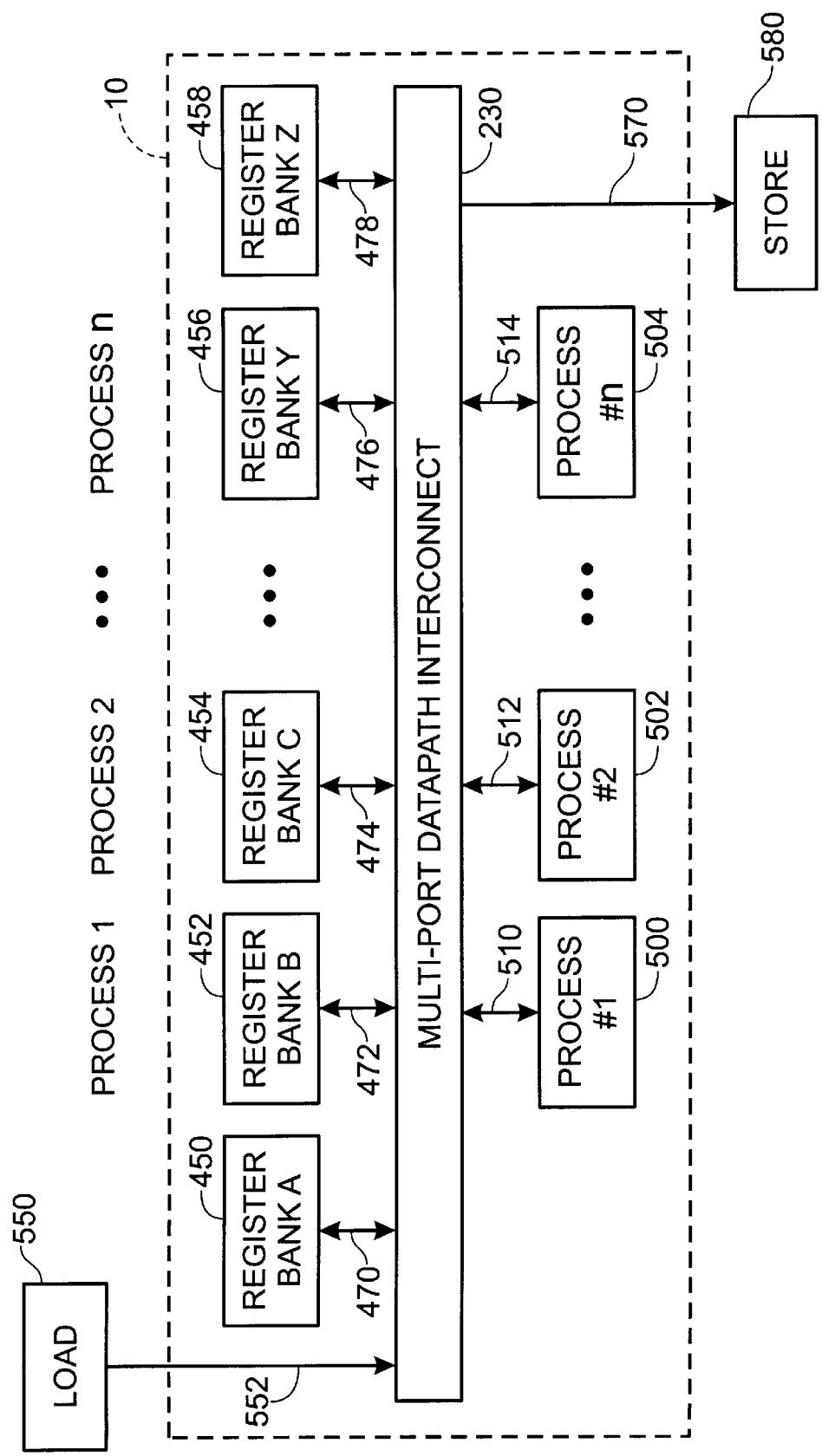

DATA PROCESSING SYSTEM USING A SHARED REGISTER BANK AND A PLURALITY OF PROCESSORS

BACKGROUND AND SUMMARY OF THE INVENTION

This application is a continuation-in-part of application Ser. No. 08/515,645, filed Aug. 16, 1995, now U.S. Pat. No. 5,680,641.

The invention relates generally to computers and, more particularly, to a data processing datapath used in a register-based CPU.

General purpose register-based computers employ one or more banks of data storage registers within the CPU, where data is temporarily stored during arithmetic or other data processing. The data storage registers are usually arranged in register banks, also known as register blocks or simply registers. Individual register banks may form part of a larger block of memory such as a multiport register wherein each register bank is a separately-addressable portion of the multiport register, with a separate set of input/output ports. The size of each register bank is determined by the internal architecture of the computer and is a matter of design choice. Data flows into and out of the registers of the CPU through buses which connect with larger computer memory storage units and with one or more the arithmetic and logic units (ALUs) of the CPU. A 32-bit CPU will typically have 32-bit data buses and 32-bit registers, allowing the data to be moved through the datapath in parallel. The data storage register banks in a CPU, together with certain other specialized registers for storing instructions and memory address information, the ALUs, and the connecting data buses used in data the processing, are collectively called the CPU datapath.

In a register-based CPU, data is moved and processed in accordance with programming instructions from a software decoder and logic control block, which is external to the datapath but is operatively connected to all major elements in the CPU. In prior art CPUs, data is retrieved from the computer's main or cache memory and loaded into the register bank of the CPU. Once the register bank has been loaded, operands in individual registers are processed by the ALU in accordance with program instructions from the logic control block. For example, the ALU might add or multiply together the contents of two different memory locations in register memory and store the result in a third register location. Once the computational processing is complete, the data is unloaded from the register bank and sent to main memory or another location in the computer. Register-based CPUs are flexible and efficient. Registers speed up processing because data can be quickly supplied to the ALU and stored in other register locations without having to load and store data through the computer's comparatively slower main memory.

While register-based CPUs are efficient in processing data, the actual active compute time in which data is processed in a single CPU datapath represents only a fraction of the total time of the processing cycle. Data must first be loaded into the CPU's register bank from memory, then processed through the ALU, and the processed data is then unloaded from the register bank and transferred to memory or elsewhere. Thus, only during the process step, when the data is resident in the register bank, does actual computing occur. The CPU is not performing actual data processing during the loading and unloading of the register banks.

An even more efficient datapath is described in co-pending patent application Ser. No. 08/515,645, filed Aug. 16, 1995, which is assigned to the same assignees as is the present application. In U.S. Ser. No. 08/515,645, a register-based CPU is described in which the arithmetic and logic unit of the CPU is connected to previously-loaded register banks which have been selectively loaded with data in accordance with an algorithmically generated address sequence that reduces the required arithmetic computations performed by the ALU. While the ALU is processing the data in one register bank, data is simultaneously loaded into a second register bank and can be simultaneously unloaded from a third register bank. The procedure minimizes the idle time of the ALU, such as when the register banks are being loaded and unloaded.

Because time is always required to move data between register banks, it would be advantageous if such data movements could be minimized. For example, certain digital signal processing (DSP) computations require data to be processed through a sequence of arithmetic processing steps which can be performed most efficiently using separate data processes or ALUs. The prior art methodology for performing such multiple processing steps employs multiple data storage register banks connected to each data processor. Data is moved from one or more register banks through its associated processor and is then transferred to one or more different register banks associated with the next processor in the series until the processing of the data is complete. Even with efficient data transfers using large parallel-transfer buses, there is a certain overhead associated with each data transfer between register banks.

It would be advantageous to provide a CPU processing datapath and architecture which would minimize the data transfer overhead required for multiple data processing steps, without requiring major changes to the operation of the CPU or to the programming software which controls its operations.

It would also be advantageous in a register-based CPU allow a CPU having a plurality of ALUs to move and process the data through a sequence of ALUs by changing predetermined control signals in the datapath instead of moving the data through a series of register banks.

It would also be advantageous to improve the computational efficiency of a CPU datapath in a register-based computer by allowing the ALUs to share register banks in the datapath.

Accordingly, a datapath for a system of register-based data processors is provided. The datapath is operatively connected to external data sources and destinations, and to an external controller for controlling the datapath, and further comprises the following. A plurality of data storage register banks are provided, each having one or more input/output ports through which operative connections to the register banks are effected. A plurality of data processors are provided for processing data in one or more data storage register banks, when individual register banks are operatively connected to a data processor. The register banks are operatively connected to selected devices, both in and outside the datapath using a datapath interconnect system. The interconnect system operatively connects register banks to the data processors in the datapath and the data sources and destinations outside of the datapath. An interconnect controller is provided for producing control of signals which operatively connect each register bank to a sequence of selected devices. The sequence includes a) operatively connecting a register bank to a data source to load data into the register bank; b) operatively connecting the register bank to a first of said data processors to process data in accordance with the first data processor; c) operatively connecting the register bank to a second of the data processors to process data in accordance with the second data processor; d) and operatively connecting the register bank to a data destination for unloading of the data from the register bank to the data destination. The interconnect controller operatively connects one or more additional register banks to the selected devices in the above-described sequence, preferably as the sequence is being carried out. Thus, as sequence step b is being carried out with respect to one register bank, sequence step a is being carried out with respect to another register bank and as sequence step c is being carried out with respect to the first register bank, sequence step b is being carried out with respect to the second register bank while sequence step a is being carried out with respect to a third register bank, and so on. The system allows the data in each register bank to be processed through a sequence of data processors by sequentially connecting the register bank to such sequence of data processors.

In its preferred form, the datapath interconnect system employs a multi-port register having multiple input/output ports and each register bank in the datapath is a separately-addressable portion of the multi-port register. In such a system, the interconnect controller provides address incrementation as necessary to address the individual register banks within the multi-port register. In that way, the interconnect controller provides control signals which operatively connect each separately-addressable portion of the multi-port register to the selected devices in the above-described sequence a) through d). Alternatively, the datapath interconnect system can be a multiplexer system controlled by the interconnect controller in which a plurality of multiplexer switches interconnect the input/output ports of individual register banks to the above-described sequence of selected devices.

Although the sequence of selected devices specifies a first and second data processor to which individual register banks are operatively connected the datapath of the present invention allows for the efficient processing of data through n processors, where n is greater than or equal 2. The interconnect sequence allows each register bank to be operatively connected to any number of data processors.

The invention further includes a method for use in a datapath of a register-based CPU of the type just described. The method includes the steps of:
  loading data into a first register bank in the datapath;
  operatively connecting the first register bank to a first data processor to process data therein in accordance with the first data processor;
  operatively connecting the first register bank to a second data processor to process data in accordance with the second data processor;
  unloading the data from said first register bank to a destination in the CPU, whereby the data in said first register bank is processed through a sequence of data processors.

A major advantage of the system and method of the present invention is the reduction in the number of data transfers between register banks, in comparison to conventional CPU datapath methodologies. The present invention avoids many data transfers in multiple processing steps by sending control signals to an interconnection system to change the connections between a plurality of data processors and a plurality of data storage register banks. It is always faster to move control signals than to move data. Thus the present invention reduces overhead in data processing.

BRIEF DESCRIPTION OF THE DRAWINGS

FIG. 4 is a table illustrating the port interconnection sequences for the datapath interconnect system of FIG. 3.

FIG. 8 is a schematic illustration of a datapath as in FIG. 6 showing an alternative embodiment of the invention.

DETAILED DESCRIPTION OF THE PREFERRED EMBODIMENT

Figure 1:
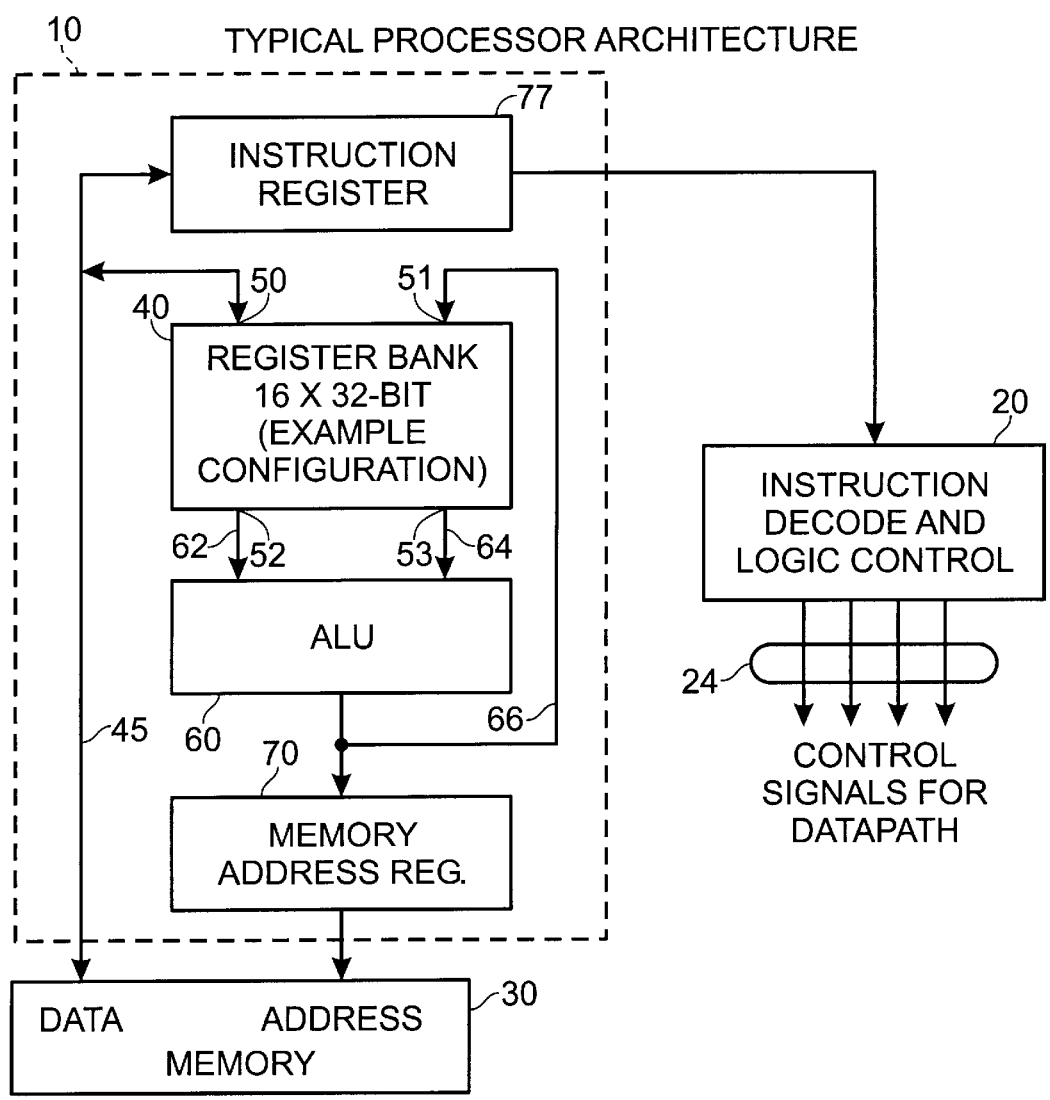
FIG. 1 (prior art) is a schematic illustration of a CPU datapath in a register-based computer.

FIG. 1 (prior art) shows a representative prior art CPU datapath for a register-based computer. Datapath 10 includes the elements of the CPU which handle the computation of data. FIG. 1 is a simplified schematic illustrating the main active elements and connecting data buses of datapath 10. Numerous operational connections familiar to those skilled in the art have been omitted from FIG. 1 and the other figures herein in order to clearly illustrate the essential features of the present invention. For example, the instruction decode and logic control block 20 is operationally connected to all the illustrated elements in datapath 10 via a plurality of signal paths illustrated schematically at 24. Instruction decode and logic control block 20 is an external controller for datapath 10 and controls the various elements of the datapath, as well as other parts of computer (not shown) based on software programming and control signals supplied to the logic control block 20 in a manner well known to those skilled in the art. The other external element shown in FIG. 1 is memory block 30, which schematically represents the computer's main memory, including cache memory. Data and operational instructions are retrieved from and stored in memory 30 by datapath 10, using the coding and instruction format of the computer. The present invention is directed to the architecture of datapath 10 and an improved method of operating such a datapath and is not limited to any particular software or instruction format or type.

The datapath 10 shown in FIG. 1 is a simplified schematic showing the essential elements of a prior art register-based CPU. A register bank 40 consisting of sixteen 32-bit data storage registers is shown at 40. Register banks of different sizes may alternatively be used with the present invention. Register bank 40 may also contain additional storage registers for holding program status information or the like. The present invention is directed to the data storage registers used in computation functions and not the various status registers which might also be provided in a CPU datapath.

Data bus 45 is a 32-bit bus which carries data to and from memory 30. Register bank 40 has one or more input/output ports (I/O ports) for loading and unloading data into the registers. As illustrated in FIG. 1, register bank 40 has I/O ports 50, 51, 52, 53. Port 50 connects to datapath 45. Ports 52, 53 supply data from register bank 40 to the arithmetic and logic unit (ALU) 60 of the CPU. The ALU performs mathematical computations via connecting buses 62, 64. Buses 62, 64 are schematic. Typically, two or more main data buses are provided in a CPU datapath for carrying data between the major elements of the CPU. That allows the ALU to read a plurality of registers simultaneously. The result of an ALU operation is returned to the register bank via a separate bus line illustrated schematically in FIG. 1 at 66.

ALU results may alternatively be written to a memory address register 70, which supplies address information to computer memory 30 for the storage of data unloaded from register bank 40 and returned to memory via bus 45. ALU results may also be returned directly to memory through memory address register 70, in accordance with programming instructions from logic control block 20. A separate programming instruction register 77 is also provided in datapath 20 for sending instructions to logic control block 20. The instruction register stores instructions in response to an instruction fetch command from the logic control block, which bypasses the ALU.

Figure 2:
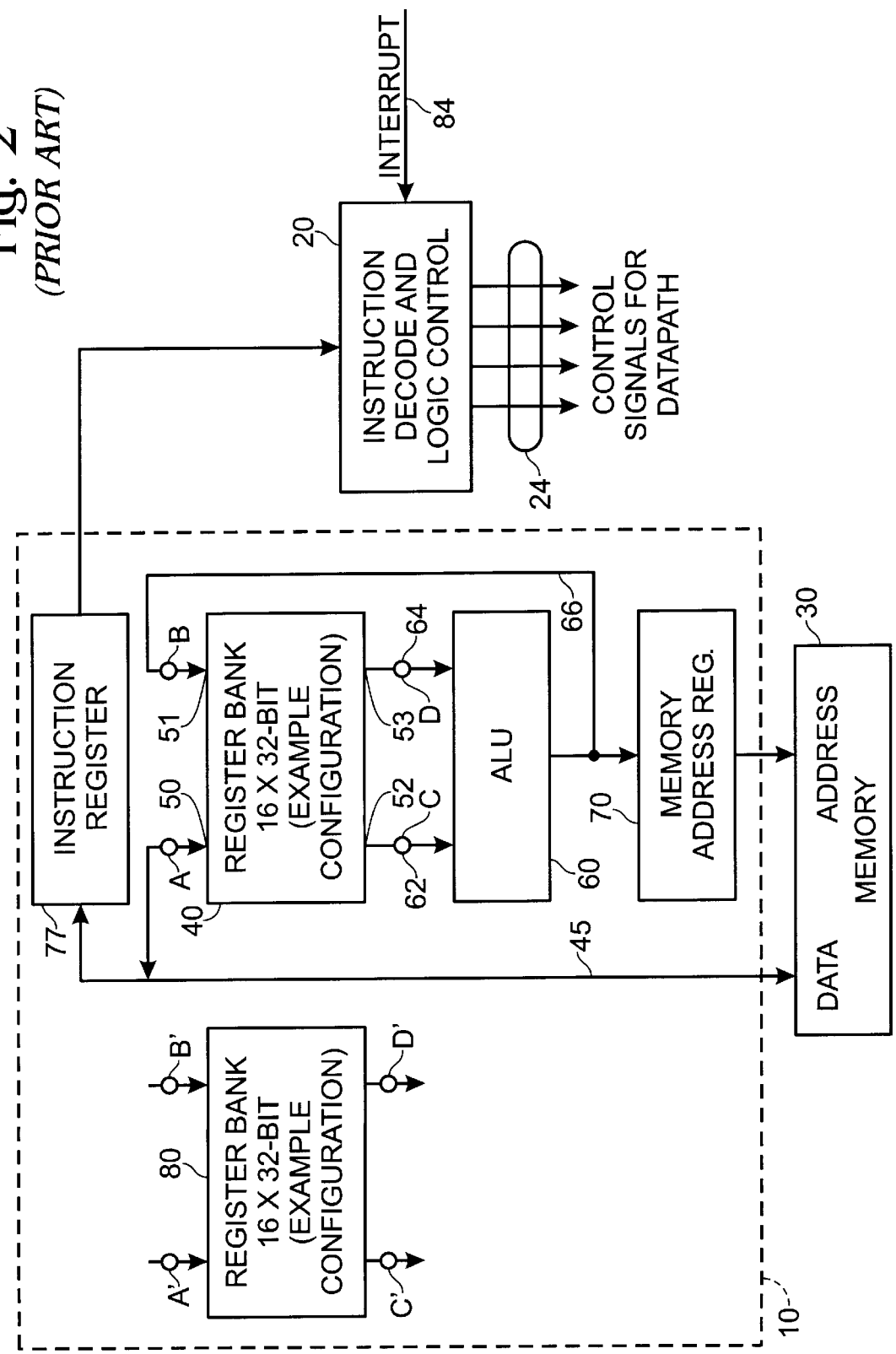
FIG. 2 (prior art) is a schematic illustration of a CPU datapath as in FIG. 1 including a second register bank for processing interrupts.

FIG. 2 is a schematic of a datapath 10 and associated devices similar to that shown in FIG. 1. Like elements in FIG. 2 have been assigned the same reference numbers used in FIG. 1. The datapath 10 shown in FIG. 2 includes one prior art approach to solving computational inefficiencies presented by the loading and unloading of data into register bank 40 in a datapath having a single ALU. That problem is the "down time" of ALU 60 whenever data is being loaded or unloaded from the register via the one or more of the I/O ports 50, 51, 52, 53. The ALU cannot process data or perform computations during loading or unloading. The retrieval from storage of data in memory 30 takes at least several clock cycles. Storage addresses must be identified for each data item transferred. In some circumstances the load/unload delay to access memory 30 is unacceptable. A program interrupt, for example, wherein the computer software interrupts the CPU processing to handle and alternative computation given priority by the computer requires the active register bank 40 to be cleared of data. FIG. 2 shows one solution used by several computer manufacturers to avoid the delay which such an event would cause. This solution is to provide a second parallel register bank 80, similar or identical to register bank 40, which can be swapped for register bank 40 upon receipt of an interrupt command. The interrupt is illustrated schematically in FIG. 2 by arrow 84. Upon receipt of an interrupt instruction, the CPU will typically complete the calculation in progress and then swap register bank 80 for register bank 40 to preserve the data in register bank 40. In that way the contents of register bank 40 need not be unloaded to memory 30 in order to free the registers for interrupt processing. The substitution of register bank 80 for register bank 40 within datapath 10 speeds interrupt response time and allows the CPU to quickly return to its pre-interrupt state when the interrupt event is completed.

In FIG. 2, the swapping of register banks 40 and 80 is illustrated schematically. The data bus lines to I/O ports 50, 51, 52, 53 have been assigned and letters A, B, C, D, respectively. Identical I/O bus lines are connected to I/O identical ports 50, 51, 52, 53, on register bank 80 which are designated A', B', C', D'. The connections through bus lines A, B, C, D, are redirected through lines A', B', C', D' when the register banks are swapped during an interrupt. As will be understood by those skilled in the art, the actual switching of connections between register banks 40 and 80 is accomplished by suitable interconnects such as multiplexer switches (not shown) controlled by logic control block 20 within datapath 10. The configuration of a multiplexer for accomplishing the swap between register banks 40 and 80 will depend on the number and location of the I/O ports and processor ports and can be accomplished as required by the layout and wiring of the datapath 10. Alternatively, register banks 40 and 80 need not be necessarily physically separated from one another and, in fact, might be part of a single larger register bank. Functionally, register bank 80 remains separate and unused except during interrupt response and the I/O and processor ports 50, 51, 52, 53, on register bank 80 are disabled and unconnected to any external data buses except during interrupt response. If register banks 40 and 80 are both part of a larger block containing a plurality of register banks, the I/O and processor ports of the portion of the block containing register bank 80 are disabled until needed for interrupt response. Numerous variations on the physical architecture to carry out the function of register bank 80 as part of interrupt response are available in the prior art and other alternatives will readily occur to those skilled in the art.

The technique of providing a redundant data storage register bank 80 for fast interrupt response is used in many register based CPUs, for example, the Z80, manufactured by Zilog, Inc. of Campbell, Calif. and the ARM 600 series of RISC processors. The technique of FIG. 2 saves time during interrupts and preserves the processor state during CPU data processing but, as presently used, is limited to interrupt functions only.

Figure 3:
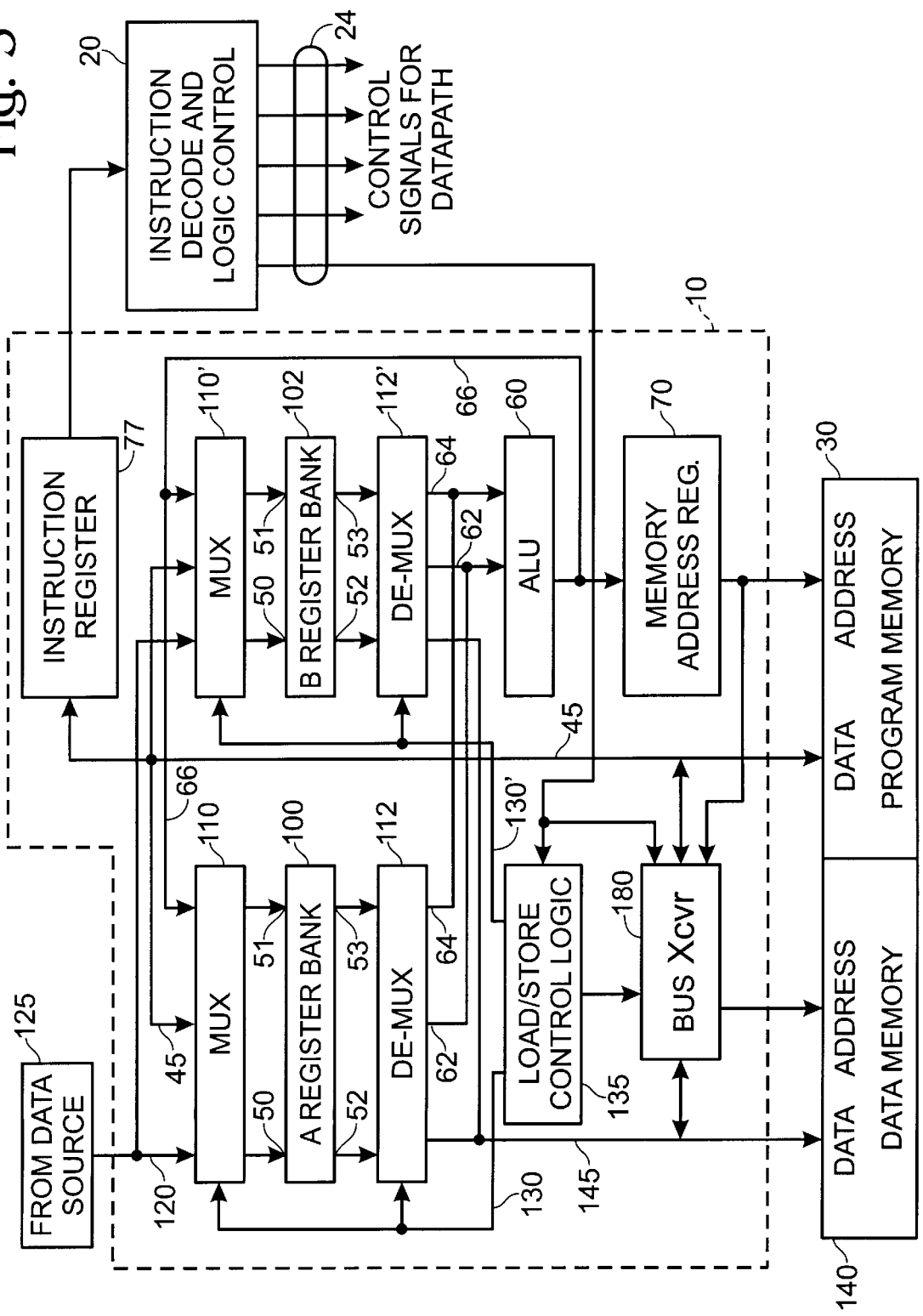
FIG. 3 is a schematic illustration of a suitable datapath interconnection system using multiplexers and de-multiplexers for connecting two interchangeable register banks between a single ALU.

FIG. 3 illustrates a suitable datapath interconnecting system which employs multiplexers and de-multiplexers to form the necessary operative connections between the register bank and ALU in the datapath shown in FIG. 2. Those elements of CPU datapath 10 which are common to the prior art datapaths illustrated in FIGS. 1 and 2 have been assigned the same reference numbers in FIG. 3 and the functionality of those elements is the same as the elements previously described with reference to FIGS. 1 and 2. In the CPU datapath 10 of FIG. 3, two identical and interchangeable register banks, identified as register 100 and register 102, are used to load, process, and unload data for CPU computations. The difference between register banks 100 and 102 and register bank 40 in FIG. 1 is that I/O and processor ports 50,51, 52,53, as illustrated and described in FIG. 1, and as provided on register banks 100, 102 are connected to multiplexers 110, 110' and de-multiplexers 112, 112'. The purpose of the multiplexers and de-multiplexers is to provide a datapath interconnect for selectively connecting the ports of register banks 100, 102 to the ALU 60 and data bus 45.

Multiplexer 110 includes at least 3 sources of data for loading and unloading data into the registers of register bank 100. One input to multiplexer 110 is data bus 45 and another is ALU output bus 66. A third input is from an alternate data source 125 via bus 120. The alternative data source 125 might be, for example, a real-time data stream from a digitized video or audio signal. Multiplexer 110 selects from these data sources based on commands to the multiplexer supplied on control line 130 from load/store control logic block 135. Load/store control logic block receives control instructions from computer logic control block 20 in accordance with a pre-programmed instructions based on the computer's operating software.

Multiplexer 110' also has a plurality of input data sources for connecting to ports 50, 51 and register bank 102. The data sources are same data sources supplied to multiplexer 110. Multiplexer 110' is controlled by load/store control logic block 135 by a line 130' in the same manner as multiplexer 110.

The interpositioning of multiplexers 110, 110' between the data inputs and the I/O input ports of register banks 100, 102, respectively, effectively increases the number of I/O ports to the register banks by allowing for at least an additional source of data to be connected to the register banks 100, 102.

De-multiplexer 112 is connected to processor ports 52, 53, of register bank 100 and directs data to ALU 60 via buses 62, 64. An alternative output transfer location from de-multiplexer 112 is to a separate data storage location 140, via bus 145.

De-multiplexer 112' receives data from processor ports 52, 53, of register bank 102 and, like de-multiplexer 112, directs data to buses 62, 64, and 145. De-multiplexers 112, 112' are both controlled by load/store control logic block 135 via lines 130, 130', respectively. The operative effect of installing de-multiplexers 112, 112' between the processor ports of 52, 53, of register banks 100, 102, respectively, and ALU 60, is to select which of the two register banks 100, 102, is connected to the ALU 60. Similarly, multiplexers 110, 110' are alternatively A connected to data buses 45 and 66, or to bus 120, depending on the control instructions received from load/store control logic 135.

FIG. 4 is a table illustrating the sequence of connections effected by load/store control logic 135, multiplexers 110, 110' and de-multiplexers 112, 112'. The connections to the I/O and processor ports 50, 51, 52, 53, for register bank 100 are in the left column beneath "Register A(100)." In the sequence step 1 of the table ports 50, 51, 52, 53, of Register 100 are connected, respectively, to buses 45, 66, 62, 64. As such, register bank 100 is being employed in processing data. Concurrently with the aforementioned connections to register bank 100, the I/O processor ports 50, 51, 52, 53, of register bank 102, are as shown in the right column of sequence step 1, beneath the title "Register B(102)." Port 50 of register 102 is connected to bus 120 and port 52 is connected to bus 145, which means register bank 102 is in the load/unload made of operation. In the next sequence, step 2, port 50 of register bank 100 is connected to bus 120 and port 52 is connected to bus 145, and register bank 100 is in the load/unload mode. Concurrently, in sequence step 2, the ports 50, 51, 52, 53 of register bank 102 are connected, respectively, to buses 45, 66, 62, 64, and register bank 102 is in the process phase of operation in which data is being processed through ALU 50. Sequence step 3 repeats the connections described for sequence step 1. Sequence step 4 repeats the connections described for sequence step 2. The sequence of connections can be repeated in this manner indefinitely.

The datapath shown in FIG. 3 allows register banks 100, 102 to be repeatedly swapped between load/unload operations and the data processing operations. While register bank 100 is being unloaded and reloaded with data, register bank 102 is connected to ALU 60 and the data therein is being processed. When the I/O port and processor port interconnections are switched by load/store control logic block 135, the data in register bank 100 is processed while, concurrently, data is being unloaded and reloaded into register bank 102.

In effect, the load/store control logic 135 operates as an interconnect controller operatively connected to interchangeable register banks 100, 102. Load/store control logic 135, together with multiplexers 110, 110' and de-multiplexers 112, 112' operate as a datapath interconnect system to operatively connect the input/output ports of one of the interchangeable register banks (100 to 102) to ALU 60, whereby the data in that register bank is processed, while selectively connecting the idle ports of the other register bank to data buses 120, 145, whereby data is loaded into and unloaded from the other register bank. Multiplexers 110, 110' and de-multiplexers 112, 112' then permit the interconnections just described to be reversed, and the first multiplexer is connected to data load/unload buses 120, 145, while the second register bank is connected to the I/O processor ports for processing data therein. The ability to switch register banks 100, 102, between load/unload functions and data processing functions shortens processing time and results in more efficient processor operation. The basic functional operation of the datapath 10 shown in FIG. 3 is the same as the datapath shown in FIG. 1, except for the switching between register banks 100 and 102. Consequently, the software written for the main processor logic control block 20 shown in FIG. 1 will operate virtually unchanged in the datapath of FIG. 3, since the essential architecture and connections to CPU datapath are unchanged, once a register bank has been connected to ALU 60.

The foregoing has divided illustrative background for understanding the typical prior art architecture of a CPU datapath. The datapath of FIG. 3 permits streams of data from a source such as a real-time video input to be more efficiently processed then the signal register bank system shown in FIG. 1. Data is loaded and unloaded from 1 register bank while a separate set of data in another register bank is being processed by the ALU. The data in both register banks is preferably accessible for other processing operations or for monitoring by the logic controller 20 and preferably all the data buses in the data buses in the datapath can be monitored and accessed as required. Accordingly, datapath 10 includes a bus transceiver 180 connected to all the data and address buses to allow general computer operations to be monitored by the external controller encompassed by control logic lock 20.

Figure 5:
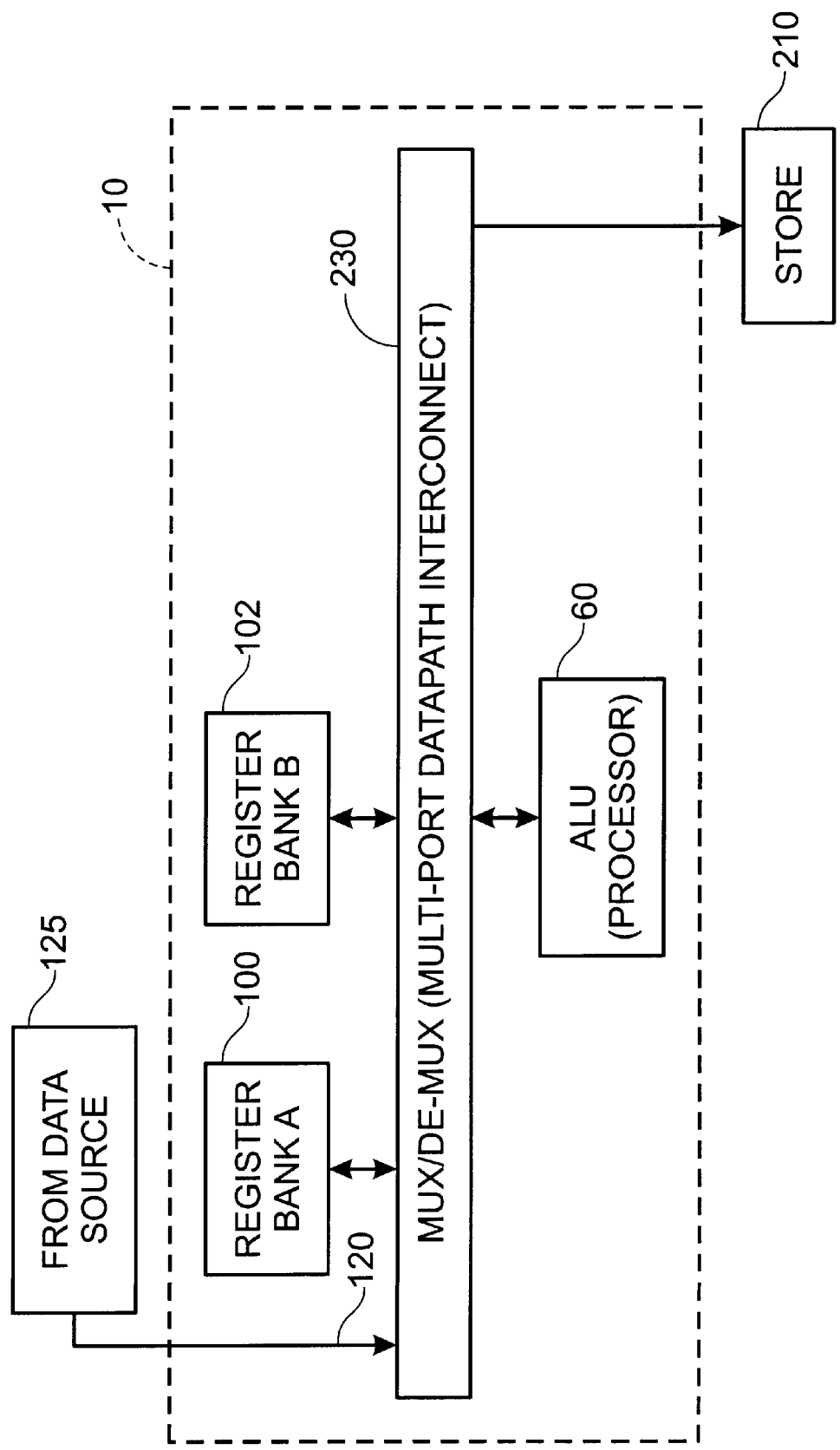
FIG. 5 is a simplified schematic illustration of the datapath of FIG. 3.

FIG. 5 provides a simplified schematic illustration of the datapath of FIG. 3 which will serve in simplifying the required description in the embodiments of the present invention which follow. The present invention provides a datapath having a plurality of processors (ALUs) which share one or more register banks, and the complexity of showing all the interconnections of FIG. 3 will be confusing. Moreover, the connections illustrated in FIG. 3 are well known to those skilled in the art of register-based processing and a more simplified schematic is adequate to enable someone skilled in the art to provide a suitable architecture for carrying out the present invention. In FIG. 5, the box "Reg. Bank A" is register bank 100 in FIG. 3 and "Reg. Bank B" is register bank 102. Data source 125 is the external data source outside the datapath 10, as in FIG. 3. Data processor 60 is ALU 60 in FIG. 3. The destination "Store 210" is the computer main memory 30, including the data storage location block 140 outside datapath 10. Multi-port datapath interconnect 230 is a schematic representation of the datapath interconnect system which, in FIG. 3, includes MUXs 110, 110' and DE-MUXs 112 and 112', as well as the load/store control logic block 135. Datapath interconnect 230 includes operative connections between all the other elements and destination 210 shown in FIG. 5.

The operation of the datapath of FIG. 5 is the same as datapath 10 in FIG. 3. Data is transferred from data source 125 to, for example, register bank A100 via input bus 120, the data passing through interconnect 230 and being routed to Register Bank A 100. Then, register bank A is connected through interconnect 230 to processor 60 while data is loaded from data source 125 via bus 120 through interconnect 230 to Register Bank B102. When processing is completed on the data in register Bank A 100 Register Bank B 102 is connected via interconnect 230 to processor 60 while the data in register bank A100 is unloaded to external memory 210.

Datapath interconnect 230 may be an interconnection system other than a set of multiplexers and de-multiplexers. For example, the datapath memory banks A and B could consist of separately-addressable ports of a single multi-port memory. Having a plurality of input/output ports as is well known in the art. A numerical block of addresses is used to access register bank A and a different numerical block of addresses accesses register bank B. In such a configuration, interconnect 230 would include a suitable address incrementor for insuring that the desired operative connections are established between each separately-addressable register bank and the devices to which it is operatively connected. That is done by incrementing the addresses to selectively direct the data being loaded or unloaded from one of the respective register banks so that the data is directed to the appropriate register bank. Datapath interconnect 230 also provides the operative connections to the external data source 125 and destination 210, as well as to data processor 60.

Figure 6:
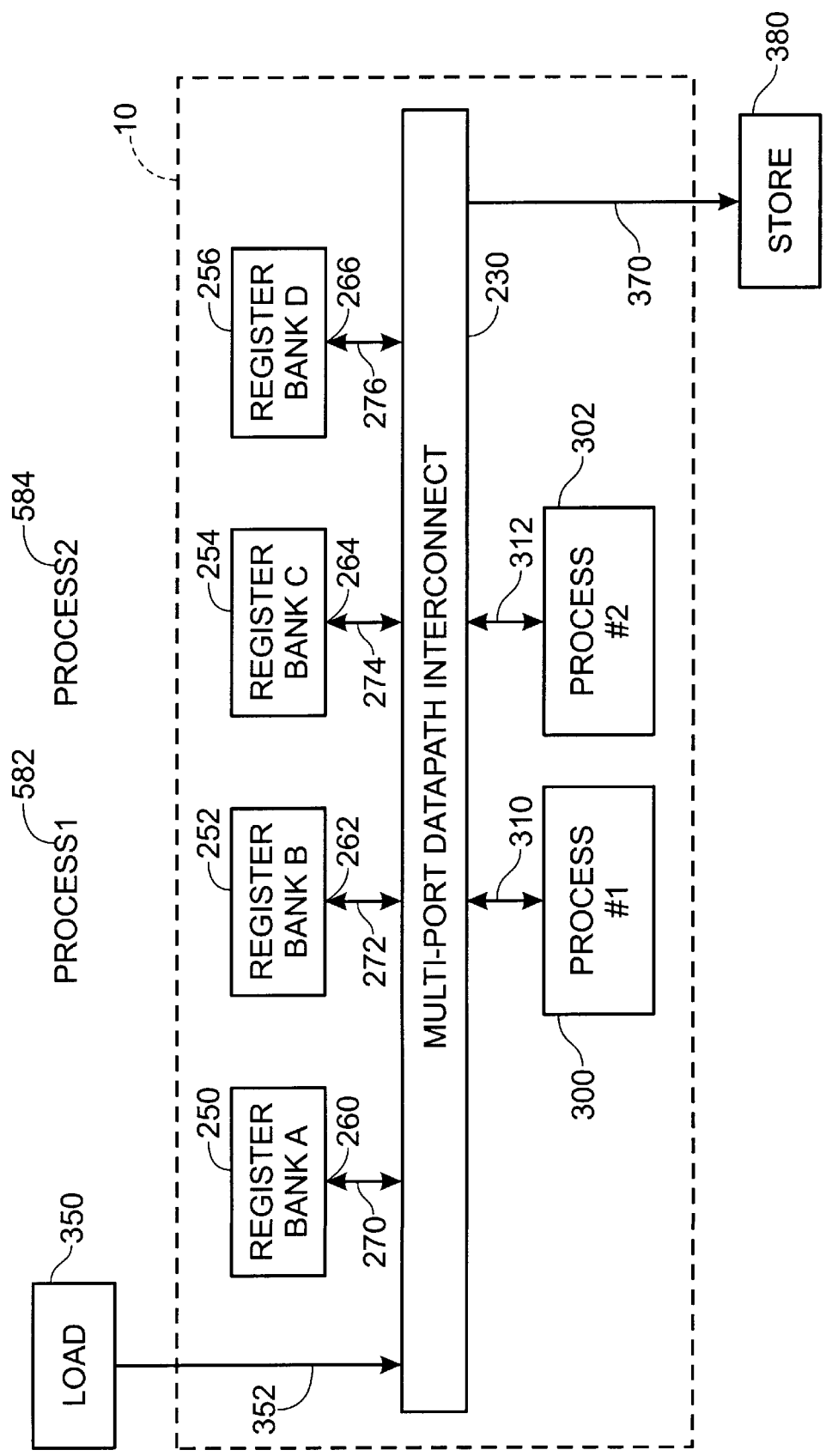
FIG. 6 is a schematic illustration of a datapath in accordance with a first embodiment of the present invention.

FIG. 6, which is a schematic representation of a datapath as in FIG. 5, shows a first embodiment of the present invention in which two data processors (ALUs) each share a plurality of register banks in the datapath in order to sequentially process data efficiently. Datapath 10 shows a CPU datapath for a register-based computer which is operationally controlled by an instruction decode and logic controlled block (not shown) like block 20 in FIG. 1. Datapath 10 includes a plurality of data storage register banks A, B, C, and D, 250, 252, 254, and 256, respectively. The register banks can be part of a suitable multi-port register wherein each separate register bank is separately addressable through separate input/output ports (I/O ports). The I/O ports for Register Bank A 250 are schematically illustrated at 260; the I/O ports for Register Bank B 252 are shown at 262; the I/O ports for Register Banks C 254 are shown at 264, and the I/O ports for Register Bank D 256 are shown at 266.

Register banks A–D are operatively connected to the devices in and outside datapath 10 through a multi-port datapath interconnect 230. Buses 270, 272, 274, and 276 provide the interconnections between the register banks A, B, C, D, respectively, and interconnect 230. As will be understood by those skilled in the art, interconnect 230 is suitably a multi-port interconnect bus which includes an address incrementor (not shown) for addressing separately-addressable portions of a segmented multi-port memory.

Figure 7:
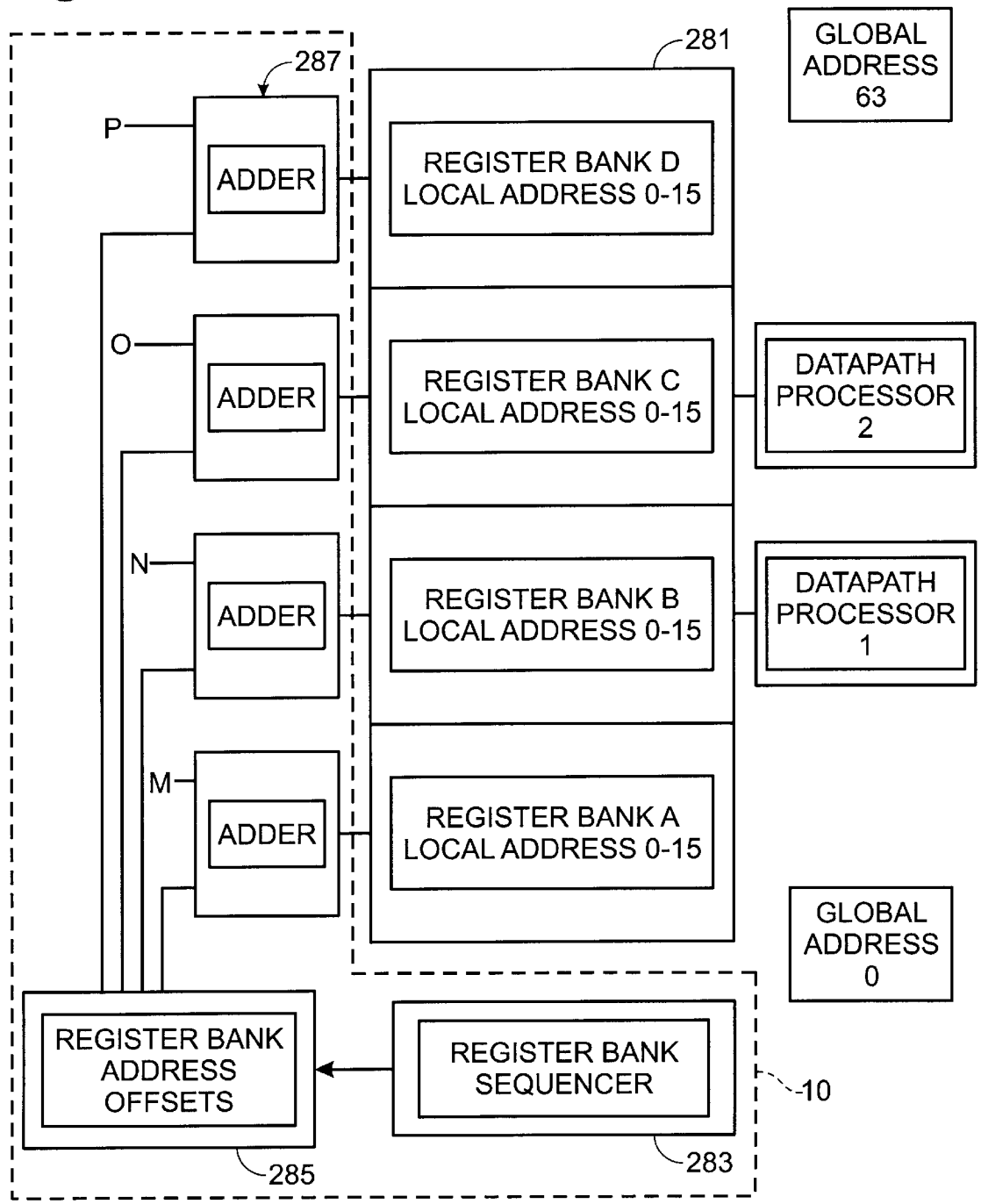
FIG. 7 is a schematic illustration of an embodiment of the multi-port interconnect in the datapath using a multiport register.

FIG. 7 shows an example of how a multi-port memory would be implemented as part of datapath interconnect 230. In FIG. 7, box 281 represents a multiport register bank having four separately-addressable register banks A, B, C, and D, as in FIG. 6. For ease of explanation, each register bank is addressable by internal address which are separated by 16-bit intervals. Register Bank A is addressable as addresses 0–15; Register Bank B is addressable as 16–31, etc. As data arrives at datapath 10, the interconnect system forms an operative connection to each selected register bank by incrementing the addresses by the appropriate amount required to reach addresses in the target register bank. That is accomplished by a register bank sequencer 283 which calls up the appropriate increment from a register 285 that stores the register bank offsets for Register Banks A, B, C, and D. The offset values are then transferred to adders 287 which combine the selected offset value with the incoming data addresses on lines M, N, O, and P. The offsets, when combined with the incoming address information, insure that only one of the local Register Banks will be addressed, creating an operative connection to that Register Bank. Other suitable operative interconnect systems within the scope of the present invention will occur to those skilled in the art.

Alternatively, interconnect 230 can be one or more multiplexers and de-multiplexers interconnecting the register banks with other devices in and outside the datapath in the manner generally illustrated and described with reference to FIGS. 3 and 4.

The datapath of FIG. 6 includes first and second data processors or ALUs identified as processor 1 300 and processor 2 302. The data processors 300, 302 can be any suitable type of computational processor which processes operands in individual memory locations within a memory to which it is connected. In the present invention, each data processor 300, 302 is sequentially connected to, and shares, all of the register banks A–D in datapath 10. The register banks are sequentially connected to each processor as directed by the external computer controller (not shown). The type or complexity of processing performed by data processors 300, 302 is a matter of design choice and not limited by the present invention. One of the processors can be a very simple arithmetic processor, adding or subtracting numbers, for example, while the other can be a highly complex DSP-type processor. Regardless of the type of processing performed, the data in a register bank which is connected to one of the processors 300, 302, is processed in accordance with that processor's algorithm and instructions.

In the embodiment of FIG. 6, processor 300 is operatively connected to register banks A through D via interconnect bus 310 and datapath interconnect 230. Processor 302 is operatively connected to register banks A through D via interconnect bus 312 and datapath interconnect 230.

Operation of the datapath 10 of FIG. 6 will now be described with reference to Table 1. The table shows a sequence of connections which are made in order to process data through processors 300 and 302, the connections being described in a manner similar to the sequence shown in the table of FIG. 4. Referring to FIG. 6 and Table 1, the first step in the sequence is to load data from an external data source 350 via data input bus 352 into Register Bank A 250 via bus 270. This interconnection

TABLE 1

Interconnection Sequence for FIG. 6

| Seq. | Register Bank A | Register Bank B | Register Bank C | Register Bank D |
|---|---|---|---|---|
| | Connect Buses | | | |
| 1 | 352/270 (Load) | | | |
| 2 | 270/310 (Process 1) | 352/272 (Load) | | |
| 3 | 270/312 (Process 2) | 272/310 (Process 1) | 352/274 (Load) | |

TABLE 1-continued

Interconnection Sequence for FIG. 6

| Seq. | Register Bank A | Register Bank B | Register Bank C | Register Bank D |
|---|---|---|---|---|
| 4 | 270/370 (Store) | 272/312 (Process 2) | 274/310 (Process 1) | 352/376 (Load) |
| 5 | 352/270 (Load) | 370/272 (Store) | 274/312 (Process 2) | 276/310 (Process 1) |
| 6 | 270/310 (Process 1) | 352/272 (Load) | 274/370 (Store) | 276/312 (Process 2) |
| 7 | 270/312 (Process 2) | 272/310 (Process 1) | 352/274 (Load) | 376/370 (Store) |
| 8 | 270/370 (Store) | 272/312 (Process 2) | 274/310 (Process 1) | 352/376 (Load) |
| 9 | 352/270 (Load) | 370/272 (Store) | 274/312 (Process 2) | 276/310 (Process 1) |
| . | | | | |
| . | | | | |
| . | | | | | is effected by datapath interconnect 230 either through switching the appropriate connections in multiplexers (if multiplexers are used) or by incrementing the storage addresses of the incoming data to the addresses uniquely associated with Register Bank A using a suitable incrementor in interconnect 230. In Table 1, the operative connection between buses 352 and 270 is indicated by "350/270" and is noted as a load step by the parenthetical "(Load)." This means that data is loaded from external data source 350 into register bank A.

Sequence step 2 loads data into register bank B 252 by connecting incoming data bus 352 to bus 272. Simultaneously, register bank A 250 is connected to Processor 1 300 via processor bus 310 through datapath interconnect 230. Thus, register bank A's I/O bus 270 is interconnected with Processor 1 300, bus 310, as indicated in Table 1 by "270/310." In sequence step 2, the data in Register Bank A is processed in accordance with the arithmetic processes of Processor 1 300, as indicated in Table 1 by the parenthetical "(Process 1)."

In the next sequence step 3, Register Bank A is operatively connected to Processor 2 302, with bus 270 connected to bus 312 via datapath interconnect 230. That is indicated in Table 1 by "270/312" and the processing of the data in Register Bank A in accordance with Data Processor 2 302 is indicated by "(Process 2)". Simultaneously, Register Bank B is connected to Processor 1 via buses 272 and 310 and datapath interconnect 230, which is indicated in Table 1 as "272/310 (Process 1)." And while the data and Register Bank A is processed in Data Processor 2 and the data in Register Bank B is processed in Data Processor 1, data is being loaded in Register Bank C via buses 352 and 274 through datapath interconnect 230. This is indicated in Table 1 by "352/274 (Load)."

The next sequence step (Step 4) is to unload the processed data from Register Bank A. This is accomplished by interconnecting data bus 270 with external "unload" data bus 370. Store 380 is a schematic representation of the destination for the data emerging from datapath 10, which usually will be main computer memory as indicated at 30 in FIG. 1 and 140/30 in FIG. 3. In sequence step 4, the I/O bus 270 of Register Bank A is operatively connected to data unload bus 370 as indicated by "270/370." The parenthetical functional indication used in this step for Register Bank A is "(Store)." Simultaneously, Register Bank B is operatively connected to Data Processor 2 302 via buses 272 and 312. Also simultaneously, Register Bank C is operatively connected to Data Processor 1 300 via buses 274/310. Also simultaneously, Register Bank D is operatively connected to external data source 350 via buses 352 and 276, whereby data is loaded from external source 350 into Register Bank D 256.

In the next sequence step 5 Register Bank A is again connected to external data source 350 in the same way as in sequence step 1 above. Functionally, Register Bank A is again loaded with fresh data to be processed in accordance with sequence steps 2 and 3, after which the data is unloaded in accordance with sequence step 4. Simultaneously with Register Bank A being loaded as in sequence step 1, Register Bank B is operatively connected to unload bus 370 via buses 272 and 370 through datapath interconnect 230. Simultaneously, Register Bank C is operatively connected to processor 2 302 via buses 274 and 312 through interconnect 230. Simultaneously, Register Bank D is operatively connected to processor 1 300 via buses 276 and 310 through interconnect 230.

The above-described interconnection sequence for Register Banks A through D covers sequence steps 1, 2, 3, 4 and 5 in Table 1. The sequence is a continuous repeating sequence of connections for the register banks. Each register bank passes through a sequence of four steps, namely, Load (data loaded into the register), Process 1 (data processed by processor 1 300), Process 2 (data processed by processor 2 302), and Store (data exits the datapath via bus 370). Sequence step 5 in FIG. 1 begins a repeat of the Load step for Register Bank A; sequence step 6 begins a repeat of the Load step for Register Bank B; sequence step 7 begins a repeat of the Load step for Register Bank C; and sequence step 8 begins a repeat of the Load step for Register Bank D. The interconnection steps then repeat every fourth step, step 9 being a repeat of sequence step 5, step 10 being a repeat of sequence step 6, etc.

The above-described datapath allows each of a plurality of data processors to share each of a plurality of register banks by shifting the interconnections between the data processors and individual register banks. This minimizes the transfer of blocks of data between register banks within a datapath. Instead, the present invention shifts the connections between register banks and processors by sending control signals to the various elements in the datapath which establish those connections. It is always faster to move control signals than to move data, which is why the datapath configuration of the present invention is faster than prior art datapaths wherein the data is moved serially through a sequence of register banks or other memory storage devices.

The present invention is not limited to datapaths wherein data is processed by two different data processors as shown in FIG. 6, but may be used to sequentially connect a plurality of data banks through any number of data processors. FIG. 8 schematically illustrates a datapath 10 in accordance with the present invention which includes Register Banks A through Z, with Z representing any integer number including numbers larger than the alphabetical sequence of A through Z. The data in the various register banks are sequentially processed through n data processors, wherein n is any integer number. In the preferred form of the invention, Z will equal n+2, meaning the number of registered banks will be two more than the number of data processors in the datapath. That allows one register bank to be used for loading data into the register bank, one register bank for unloading data from the datapath to main computer storage, and the remaining register banks to be connected to the n data processors for simultaneous processing of data. That is the case for the embodiment of FIG. 6, wherein n=2 and Z=4.

In the embodiment of FIG. 8, the multi-port datapath interconnect 230 is either a multiplexer interconnect system as in FIG. 3 or the address sequencer interconnects system shown and described with reference to FIG. 7. Interconnect 230 interconnects the plurality of data storage memory banks A through Z, 450, 452, 454, 456, and 458, respectively. Each register bank is connected to interconnect 230 via an input/output bus 470, 472, 474, 476, and 478, respectively. Data processors 1 through n are any suitable type of arithmetic processor, regardless of the complexity of the data processing performed. Processor 1 500 is operatively connected to interconnect 230 via bus 510; Processor 2 502 is operatively connected to interconnect 230 via bus 512; and Processor n 504 is operatively connected to interconnect 230 via bus 514. Data is loaded into the selected register banks from outside datapath 10 through data source 550 schematically indicated as "Load" in FIG. 8. The incoming data bus is 552 and operatively connects to interconnect 230. Data exists the datapath 10 via bus 570 to main computer memory or another data destination as indicated schematically in FIG. 8 by "Store" 580.

Table 2 illustrates a portion of the interconnection sequence for the embodiment of FIG. 8 wherein up to n processing steps are performed using n data processors which are sequentially connected to Z register banks, wherein Z equals n+2. Only the connections for register banks A, B, and C are illustrated in Table 2, and it will be readily understood that the additional interconnections to the remaining register banks will follow the interconnection pattern of the first three register banks, as will be briefly described.

It is perhaps easiest to explain the interconnection set forth in Table 2 by describing the interconnections for each register bank.

TABLE 2

Interconnection Sequence for FIG. 8

| Seq. | Register Bank A | Register Bank B | Register Bank C |
|---|---|---|---|
| | Connect Buses | | |
| 1 | 552/470 (Load) | | |
| 2 | 470/510 (Process 1) | 552/472 (Load) | |
| 3 | 470/512 (Process 2) | 472/510 (Process 1) | 552/474 (Load) |
| . . . | | | |
| n + 2 | 470/570 (Store) | 472/514 (Process n) | 474/— (Process n − 1) |
| n + 3, Then Repeat Seq. 1 through n | 552/470 (Load) | 472/570 (Store) | 474/510 (Process 1) |
| . . . | | | |

Register Bank A 450 is first loaded from external data source 550 via buses 552 and 470 which are operatively connected through interconnect 230. In the next sequence step Register Bank A is operatively connected to data processor 1 500 through buses 470 and 510. In the next sequence step register bank A is connected to Data Processor 2 502 through buses 470 and 512. Register Bank A is next connected to Processor 2 502 through buses 470 and 512. Register Bank A is then sequentially connected to each data processor up through data processor n 504 which will occur in step n+1 through a connection between buses 470 and 514. The final step in the connection sequence for Register Bank A, shown in Table 2, is step n+2 wherein Register Bank A is connected to the datapath unloading bus 570 and the data is unloaded from the register bank and sent to main computer memory or other storage indicated at 580 in FIG. 8. Then, the sequence for Register Bank A begins again as in step 1, wherein the register bank is loaded with data from the data source 550. Sequence step n+3 in Table 2 is the beginning of the repeat cycle for Register Bank A wherein the connections shown in step 1 are repeated as is the functional "Load" step. The sequence then repeats for Register Bank A through the Process 1, Process 2 steps, etc. up through the Store step.

Register Bank B repeats the same sequence just described for register bank A, one step later, substituting the I/O port bus 472 for bus 470 in the second column of Table 2. Similarly, register bank C repeats the same sequence beginning with sequence step 3 wherein register bank C is loaded with data through its I/O bus 474. As in the embodiment of FIG. 6, each register bank is sequentially connected to each processor with one register bank being used for loading simultaneously with another register bank being used for unloading. There is conceptually no limit to the number of register banks and processing steps through which the above-described cycle can be repeated.

The system for sharing register banks between a plurality of data processors lends itself readily to a method of data processing in accordance with the present invention. The method is schematically illustrated in FIGS. 6 and 8 by the functional words set forth around the perimeter of datapath 10. In FIG. 6, the Load step is illustrated by the external data source load function 350, located at the left end of the datapath interconnect. For each register bank which is first loaded with data the method moves to the next step, performing the "Process 1" step 582 in which the register bank which has just been loaded is processed in accordance with first data processor 300 in FIG. 6. The next step "Process 2" 584 operatively connects the register bank to Data Processor 2 302.

In the description which follows, the steps in the process are described with reference to a single register bank which is referred to as "first register bank." The first step is loading data into the first register bank from external data source 350. Moving left to right in FIG. 6, the next step is operatively connecting the first register bank which has just been loaded with data to a first data processor, which is Data Processor 1 300 in FIG. 6. The data is then processed in accordance with Data Processor 1. The next step in the method is to operatively connect the first register bank to a second data processor, Data Processor 2 302 in FIG. 6, to process the data therein in accordance with the second data processor. And the final step is to unload the data from the first register bank by operatively connecting the register bank to external memory or storage 380.

Assuming that in the above described method the first register bank is register bank A in FIG. 6, the method preferably further includes simultaneously loading and processing a second register bank following exactly the same sequence but delayed one cycle. In other words the data in the second register bank, Register Bank B in FIG. 6, is loaded simultaneously with the data in the first register bank being processed. This step is illustrated in Table 1, wherein in sequence step 2, register bank B is simultaneously loaded while register bank A is being processed through first data processor 1. The method preferably further includes the step of loading a third register bank with data while the second register bank is operatively connected to the first data processor and the first register bank is operatively connection to the second data processor. This is illustrated in Table 1, sequence step 3, wherein register bank C is loaded while register bank B is processed in data processor 1 and the data in register bank is being processed in data processor 2, all simultaneously.

The method allows for sequentially connecting a plurality of register banks up to n data processors, wherein n is greater than or equal to 2. The number of register banks for most efficient operation of the method is preferably n+2. Each register bank passes through a sequence of four steps, namely, Load (data loaded into the register), Process 1 (data processed by processor 1 300), Process 2 (data processed by processor 2 302), and Store (data exits the datapath file.

The present invention is particularly useful in repetitive processing of streams of data, as is required for the processing of digitized video or audio signals. There are many types of processing that combine aspects of Digital Signal Processing (DSP) with other forms of digital computation. DSP is characterized by the repetitive execution of short loops of instructions on large blocks of data. Other processing is often done on these processed blocks of data, after the DSP phase of processing. For example, an FFT routine might be followed by some sequence of logical operations that use the newly computed FFT coefficients as part of a larger algorithm.

A common approach is to have separate DSP and more general CPU devices that communicate with each other in the course of an algorithm. These devices may be large systems or integrated circuits (ICs). This approach requires separate software and hardware development systems, and some form of systems integration to ensure proper operation. There are clear advantages in terms of shorter development time and simpler system hardware in being able to do efficient computation of DSP algorithms within the constraints of a standard CPU instruction set and architecture.

The main idea behind the invention described in application Ser. No. 08/515,645 (referred to as "the prior application") is to extend the notion of register context switching to reduce the program overhead of load and store instructions in a register-based data processor. This main idea is especially suitable for DSP (Digital Signal Processing) by an otherwise general purpose data processor, where small repetitive loops of calculation are repeated over large blocks of data. Data are fetched in the correct order for calculation by the fetch unit and deposited into a register bank, that bank is then operatively connected to the actual data processing element. At the conclusion of a cycle of processing, that same register bank is then operatively connected to a store unit, which writes results out to main data memory in the correct order. In the prior application, there are optimally three register banks that effectively rotate among the fetch, process, and store functions. While one register bank is being filled with fetched data, another register bank is having its data processed, while the third register bank writes finished results out to memory. If the register banks are known as A, B, and C, the rotation sequence is:

| Fetch | Process | Store |
|-------|---------|-------|
| A     | B       | C     |
| C     | A       | B     |
| B     | C       | A     |
| A     | B       | C     | and so on. In this way, the overhead of load and store operations is hidden from the data processor. Since many types of data processors perform their operations only on data in a register file (no memory references), reduction of this overhead is an important consideration.

The main ideas of the present patent application are that the rotating register bank idea can encompass many data processors rather than just one processor and associated data fetch and store units, that these data processors can be, but need not be of the same type, and that several forms of multi-port datapath interconnect are possible. Two such forms are discrete register banks and a multiplexing arrangement to operatively connect each register bank to its respective processor at the appropriate time, or, secondly, a true multi-port register file, where the operative connection is implicit in the structure of the memory itself, and a change of register bank connection is effected by introducing different address offsets to each register bank portion of the multi-port register file. There are a number of advantages of organizing a system in this way:

1. Load and store overheads are minimized, as before.
2. Intermediate processing results are easily communicated to the next stage of computation in a ready to compute format. Note that the processing elements need not be of the same type, although they can be. If the processing elements are of the same type, then a single, unified, software development environment can be used to develop code for each processing element, for its stage of the over-all computation. Ease of code development is an important consideration in systems that have multiple processing elements. It is also possible for the processing elements to be of different type, optimized to that stage of the over-all computation. For example, one datapath processing element might be more DSP-like, optimized for efficient calculation of multiply and multiply-accumulate operations, while another datapath processing element might be optimized for logical operations on the results of the preceding step.
3. Lower power and higher speed than other approaches. Although the over-all system comprises a kind of pipeline, the proposed system has the advantage over conventional pipeline schemes in that communication of results from one stage of computation to another does not require the actual movement of any data. Instead of data elements being transferred one by one from one register or register bank to another, the entire register bank has its operative connections switched at the appropriate time in the over-all computation to the next processing element in sequence. Changing the operative connection of a register bank is a much faster and lower power operation than actually moving the data in the register bank to another location or set of locations.

As previously mentioned the switching of operative connections between register banks and datapath elements can be done in at least two ways: discrete register banks whose inputs and outputs are switched by multiplexers or similar data routing switch to connect to the appropriate datapath processing element, or by embedding all of the register banks in a single multi-port register file, with separate input and output ports to connect to each datapath processing element. In this second case, the physical connections to each datapath processing element are fixed, but access to each register bank is effected by changing the address offsets at each port.

What is claimed is:

1. A register-based CPU datapath for use in processing data from selected external data sources and for supplying processed data to selected destinations, the register-based CPU datapath comprising:

a plurality of data storage register banks each having one or more input/output ports through which operative connections to said register banks are effected;

a plurality of arithmetic processors for processing data in one or more of said data storage register banks when operatively connected to an arithmetic processor;

a CPU datapath interconnect system for operatively connecting said register banks to selected arithmetic processors in the CPU datapath and to selected data sources and destinations outside of the CPU datapath; and an interconnect controller for providing control signals which operatively connect each register bank to a sequence of selected devices, said sequence including:
   a) operatively connecting a register bank to a data source to load data into the register bank;
   b) operatively connecting the register bank to a first of said arithmetic processors to process data in accordance with said first arithmetic processor;
   c) operatively connecting the register bank to a second of said arithmetic processors to process data in accordance with said second arithmetic processor; and
   d) operatively connecting the register bank to a data destination for unloading of the data from the register bank to the data destination;

said interconnect controller operatively connecting one or more additional register banks to said selected devices in said sequence, whereby the data in each register bank is processed through a sequence of arithmetic processors.

2. A register-based CPU datapath as in claim 1 in which said plurality of data storage register banks includes a multiport register having multiple input/output ports and each said register bank in the datapath is a separately-addressable portion of said multiport register.

3. A register-based CPU datapath as in claim 2 in which said CPU datapath interconnect system includes operative connections between the input/output ports of said multiport register, said arithmetic processors, and the external data sources and destinations, and said interconnect controller includes an address incrementor for providing addresses corresponding to the separately-addressable portions of said multiport register such that each register bank is operatively connected to the selected devices in said sequence.

4. A register-based CPU datapath as in claim 1 in which said plurality of arithmetic processors includes n processors and the sequence of selected devices to which each register bank is operatively connected by said interconnect controller, after connections a), b), and c), and before connection d), includes operatively connecting the register bank to additional arithmetic processors, seriatim, up to n arithmetic processors, to process data in accordance with each said arithmetic processor.

5. A register-based CPU datapath as in claim 4 in which the number of data storage register banks is at least n+2 register banks, whereby at least one register bank is connectable to a data source in accordance with sequence step a) and one register bank is connectable to a data destination in accordance with sequence step d) while other register banks are connectable to n arithmetic processors.

6. A register-based CPU datapath as in claim 1 in which said CPU datapath interconnect system includes a multiplexer system controlled by said interconnect controller for selectively interconnecting the input/output ports of said register banks to said sequence of selected devices.

7. A data processing method for use in a register-based CPU datapath, the CPU datapath including a plurality of data storage register banks each having one or more input/output ports through which operative connections to the register banks are effected, a plurality of arithmetic processors for processing data, and a CPU datapath interconnect system for providing operative connections between the register banks and the arithmetic processors, the method comprising;

loading data into a first register bank in the CPU datapath;

operatively connecting the first register bank to a first arithmetic processor to process data therein in accordance with the first arithmetic processor;

operatively connecting the first register bank to a second arithmetic processor to process data in accordance with the second arithmetic processor;

unloading the data from said first register bank to a data destination, whereby the data in said first register bank is processed through a sequence of arithmetic processors.

8. A method, as in claim 7, in which a second register bank is loaded with data while the step of operatively connecting the first register bank to a first arithmetic processor is carried out, whereby the data in said second register bank is loaded simultaneously with the data in the second register bank being arithmetically processed.

9. A method, as in claim 8, in which data is loaded into a third register bank while said second register bank is operatively connected to the said first arithmetic processor and said first register bank is operatively connected to said second arithmetic processor, whereby one register bank is loaded with data while another register bank is processed in accordance with said first arithmetic processor and yet another register bank is processed in accordance with said second arithmetic processor, simultaneously.

10. A method, as in claim 7, in which the first register bank is operatively connected sequentially to up to n arithmetic processors, wherein n is greater than or equal to 2.

* * * * *